(12) United States Patent
Kinashi et al.

(10) Patent No.: US 9,943,764 B2
(45) Date of Patent: Apr. 17, 2018

(54) NON-TRANSITORY COMPUTER-READABLE STORAGE MEDIUM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Akira Kinashi, Kyoto (JP); Shuhei Furukawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 785 days.

(21) Appl. No.: 13/845,814

(22) Filed: Mar. 18, 2013

(65) Prior Publication Data

US 2013/0316819 A1 Nov. 28, 2013

(30) Foreign Application Priority Data

May 28, 2012 (JP) ................................ 2012-121190

(51) Int. Cl.
| | |
|---|---|
| *A63F 9/24* | (2006.01) |
| *A63F 13/795* | (2014.01) |
| *A63F 13/31* | (2014.01) |
| *A63F 13/52* | (2014.01) |
| *A63F 13/30* | (2014.01) |
| *A63F 13/69* | (2014.01) |

(Continued)

(52) U.S. Cl.
CPC ............ *A63F 13/795* (2014.09); *A63F 13/12* (2013.01); *A63F 13/31* (2014.09); *A63F 13/52* (2014.09); *A63F 13/69* (2014.09); *A63F 13/822* (2014.09); *A63F 13/825* (2014.09); *A63F 13/92* (2014.09); *A63F 2300/5553* (2013.01)

(58) Field of Classification Search
CPC ...... A63F 13/10; A63F 13/822; A63F 13/216; A63F 13/12; A63F 2300/807; A63F 2300/5573; A63F 13/537; A63F 13/79; A63F 13/92; A63F 2300/64; A63F 2300/609; A63F 2300/66; A63F 2300/6653; A63F 13/327; A63F 13/332; A63F 2300/204; A63F 2300/402; A63F 2300/6045; A63F 13/44; A63F 13/53
USPC ......................................... 463/29–31, 40–42
See application file for complete search history.

(56) References Cited

U.S. PATENT DOCUMENTS 5,618,045 A * 4/1997 Kagan et al. ................... 463/40
6,951,516 B1 * 10/2005 Eguchi et al. .................. 463/40

(Continued)

OTHER PUBLICATIONS

"Nintendo 3DS, StreetPass Mii PLAZA, Nintendo", http://www.nintendo.com/3ds/built-in-software/#/3, 2 pages, printed on Mar. 15, 2013.

(Continued)

*Primary Examiner* — Justin Myhr
(74) *Attorney, Agent, or Firm* — Nixon & Vanderhye P.C.

(57) ABSTRACT

When a predetermined time has elapsed after a handheld game apparatus received "game information" from another handheld game apparatus, a character corresponding to a player of the another handheld game apparatus appears as a passerby in a shopping center in a game world of a game of the handheld game apparatus. The predetermined time is determined based on the positional relationship between the shopping center in the game world and the present position of the player character of the game of the another handheld game apparatus.

9 Claims, 7 Drawing Sheets

(51) Int. Cl.
  *A63F 13/92* (2014.01)
  *A63F 13/822* (2014.01)
  *A63F 13/825* (2014.01)

(56) References Cited

U.S. PATENT DOCUMENTS

2009/0124393 A1* 5/2009 Tanaka et al. ............... 463/42
2010/0081504 A1* 4/2010 Fujisawa ...................... 463/31
2010/0099498 A1* 4/2010 Yamada et al. .............. 463/42

OTHER PUBLICATIONS

"Dragon Quest IX, Sentinels of the Starry Sky, Official Site", http://www.dqix.jp/top.html, and the English translation thereof, 2 pages, printed on Mar. 15, 2013.
"Passing Communication", May 15, 2012, 07:53 edition, Wikipedia, [online], [searched on Jun. 8, 2016], with partial English translation <URL, https://ja.wikipedia.org/w/index.php?title=%E3%81%99%E3%82%8C%E3%81%A1%E3%81%8C%E3%81%84%E9%80%9A%E4%BF%A1&diff=42510995&oldid=41634849>.

* cited by examiner

NON-TRANSITORY COMPUTER-READABLE STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2012-121190, filed on May 28, 2012, is incorporated herein by reference.

FIELD

The technology disclosed herein relates to a non-transitory computer-readable storage medium, an information processing apparatus, an information processing system, and an information processing method, and more particularly, to those utilizing a communication function.

BACKGROUND AND SUMMARY

Conventionally, a system has been known in which a handheld game apparatus performs an automatic communication with another handheld game apparatus that is present within a communicable range, and thereby a character registered in the another game apparatus appears in the game apparatus.

A main object of the present technology is to provide a non-transitory computer-readable storage medium, an information processing apparatus, an information processing system, and an information processing method that are capable of appropriately controlling the timing at which an object is caused to appear in an information processing apparatus, which object corresponds to another information processing apparatus that is present within a predetermined range around the information processing apparatus.

The above object is achieved by configuration examples as follows.

A first configuration example is a non-transitory computer-readable storage medium having stored therein an information processing program for causing a computer of an information processing apparatus having a communication function to execute a reception process, a determination process, an object control process, and a display control process. In the reception process, object data is received from another unspecified information processing apparatus which is present within a predetermined range, by using the communication function. In the determination process, it is determined whether a predetermined object appearance condition is satisfied, after the reception of the object data. In the object control process, an object corresponding to the received object data is caused to appear in a virtual world, in response to that the object appearance condition is satisfied. In the display control process, an image of the virtual world is displayed on the display device.

The information processing apparatus is typically a handheld game apparatus, but is not limited thereto, and may be any information processing apparatus (e.g., a mobile phone, a notebook personal computer, a stationary game apparatus, a desktop personal computer, etc.).

In the reception process, the object data may be directly received from the another unspecified information processing apparatus, or the object data may be received via the Internet, a mobile phone network, or the like. In the case where the object data is received via the Internet, a mobile phone network, or the like, the another unspecified information processing apparatus existing within the predetermined range around the information processing apparatus (e.g., within a predetermined distance from the information processing apparatus) may be detected by utilizing a mechanism for detecting the position of the information processing apparatus (e.g., a GPS, a location information service using information of access points, or the like.).

The object data is data for characterizing the object caused to appear in the virtual world by the object control process, and is typically data representing the appearance of the object. The object data is not limited to the appearance data, but may be data representing the name or the like of the object.

The object may be a character that simulates a human, or any other object.

The object appearance condition may be a condition regarding time.

The object appearance condition may be that a predetermined time elapses from the reception of the object data.

In the reception process, present position information may be received from the another information processing apparatus together with the object data. The present position information represents the position of a player object in the virtual world, which player object is operated by a player of the another information processing apparatus. The information processing program may cause the computer to further execute a determination process of determining the predetermined time, based on the present position information received together with the object data.

In the object control process, the object may be caused to appear in a predetermined area in the virtual world. In the determination process, the predetermined time may be determined based on the positional relationship between the position indicated by the present position information received together with the object data, and the predetermined area.

In the determination process, the longer the distance between the position indicated by the present position information received together with the object data and the predetermined area is, the longer the predetermined time may be determined.

The object corresponding to the received object data may be an object that is automatically controlled in the virtual world by the computer.

In the object control process, the object may be caused to appear in a predetermined area in the virtual world, in response to that the object appearance condition is satisfied. Even when the predetermined area is displayed on the display device by the display control process, if the object appearance condition is not satisfied, the object may not be displayed on the display device.

The information processing program may be stored in any computer-readable storage medium (e.g., a flexible disk, hard disk, optical disc, magneto-optical disc, CD-ROM, CD-R, magnetic tape, semiconductor memory card, ROM, RAM, etc.).

A second configuration example is an information processing apparatus having a communication function. The information processing apparatus includes a reception section, a determination section, an object control section, and a display control section. The reception section receives object data from another unspecified information processing apparatus which is present within a predetermined range, by using the communication function. The determination section determines whether a predetermined object appearance condition is satisfied, after the reception of the object data.

The object control section causes an object corresponding to the received object data to appear in a virtual world, in response to that the object appearance condition is satisfied. The display control section displays an image of the virtual world on the display device.

A third configuration example is an information processing system having a communication function. The information processing system includes a reception section, a determination section, an object control section, and a display control section. The reception section receives object data from another unspecified information processing apparatus which is present within a predetermined range, by using the communication function. The determination section determines whether a predetermined object appearance condition is satisfied, after the reception of the object data. The object control section causes an object corresponding to the received object data to appear in a virtual world, in response to that the object appearance condition is satisfied. The display control section displays an image of the virtual world on the display device.

A fourth configuration example is an information processing method executed in an information processing system having a communication function. The information processing method includes: executing a reception process of receiving object data from another unspecified information processing apparatus which is present within a predetermined range, by using the communication function; executing a determination process of determining whether a predetermined object appearance condition is satisfied, after the reception of the object data; executing an object control process of causing an object corresponding to the received object data to appear in a virtual world, in response to that the object appearance condition is satisfied; and executing a display control process of displaying an image of the virtual world on the display device.

According to the present technology, it is possible to appropriately control the timing to cause an object to appear, which object corresponds to another information processing apparatus that is present within a predetermined range.

DETAILED DESCRIPTION OF NON-LIMITING EXAMPLE EMBODIMENTS

Hereinafter, one embodiment of the present technology will be described.

Figure 1:
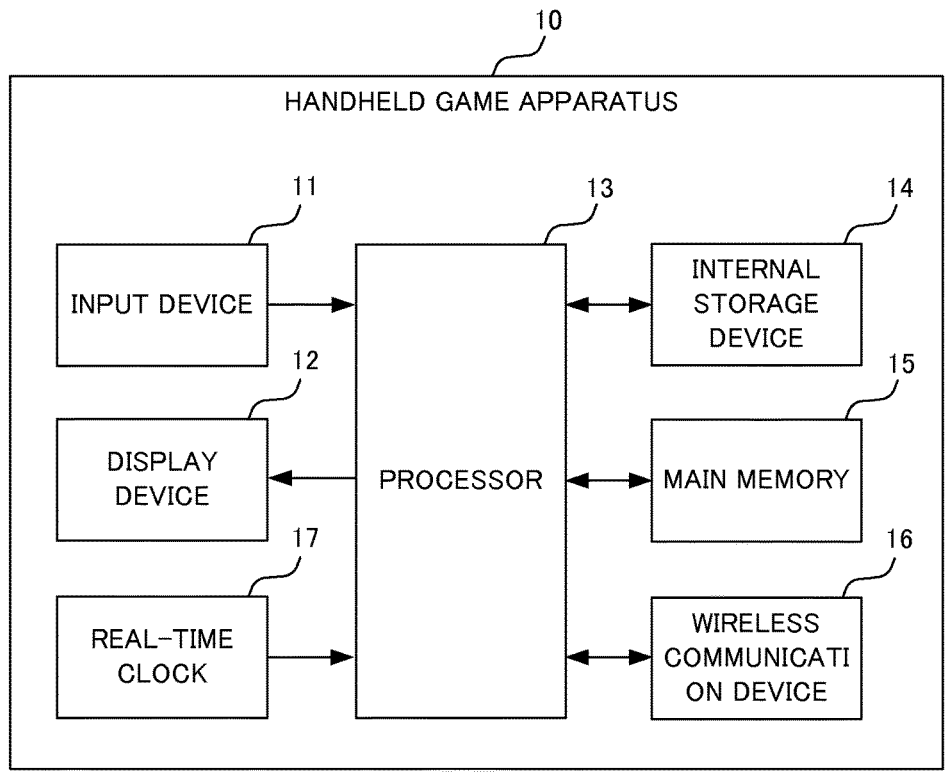
FIG. 1 is a block diagram illustrating a non-limiting example of a configuration of a handheld game apparatus 10.

In FIG. 1, a handheld game apparatus 10 includes an input device 11, a display device 12, a processor 13, an internal storage device 14, a main memory 15, a wireless communication device 16, and a real-time clock 17.

The input device 11 is operated by a user of the handheld game apparatus 10, and outputs a signal according to the operation performed by the user. The input device 11 is, for example, a cross switch, a push button, or a touch panel.

The display device 12 displays, on a screen, an image generated in the handheld game apparatus 10. The display device 12 is typically a liquid crystal display device.

A computer program to be executed by the processor 13 is stored in the internal storage device 14. The internal storage device 14 is typically a flash EEPROM.

The main memory 15 temporarily stores a computer program and data.

The wireless communication device 16 wirelessly transmits a signal to another handheld game apparatus, and wirelessly receives a signal from another handheld game apparatus.

The real-time clock 17 outputs the current time in the real world.

Next, the outline of an operation of the handheld game apparatus 10 will be described.

Figure 2:
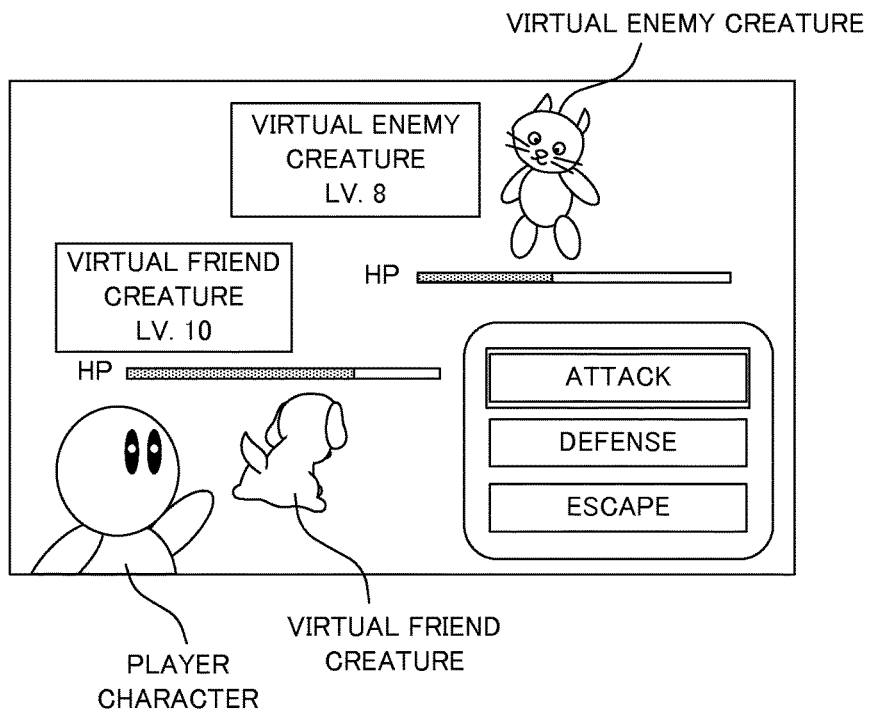
FIG. 2 is a diagram illustrating a non-limiting example of a game image.

The handheld game apparatus 10 executes game processing based on a game program. In the present embodiment, a game is executed in which a player character operated by a player gives a command to a virtual friend creature owned by the player character to cause the virtual friend creature to fight with a virtual enemy creature. For example, FIG. 2 shows a game image in which the virtual friend creature is fighting with the virtual enemy creature. The player can select a command to be given to the virtual friend creature, from a plurality of options (attack, defense, and escape).

Figure 3:
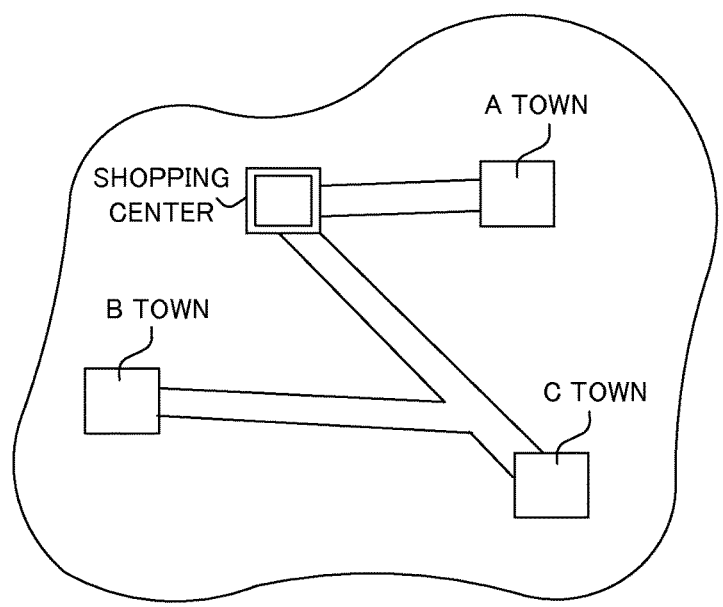
FIG. 3 is a diagram illustrating a non-limiting example of a game world.

In a game world of the above-described game, a shopping center and a plurality of towns are arranged as shown in FIG. 3. In the shopping center, a character corresponding to another player who is playing the same game is caused to appear as a passerby in accordance with a procedure described below.

Figure 4:
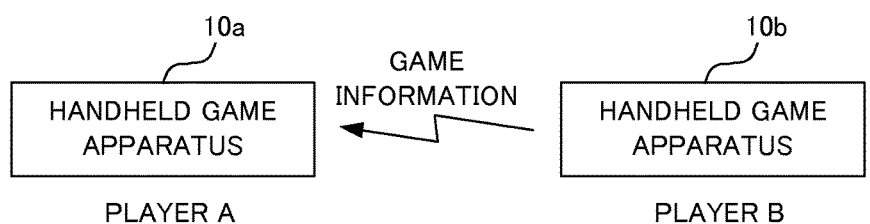
FIG. 4 is a diagram illustrating a non-limiting example of a state in which a handheld game apparatus 10a receives game information from a handheld game apparatus 10b.

In order to cause a passerby corresponding to another player to appear in the shopping center, as shown in FIG. 4, it is necessary to receive "game information" from another unspecified handheld game apparatus that is present within a predetermined range (in the present embodiment, a communicable range of the wireless communication device 16) around the own handheld game apparatus. In the following description, in order to distinguish the own game apparatus from the another handheld game apparatus, the own game apparatus is referred to as a "handheld game apparatus 10a", and the another handheld game apparatus is referred to as a "handheld game apparatus 10b". Further, a player of the handheld game apparatus 10a is referred to as a "player A", and a player of the handheld game apparatus 10b is referred to as a "player B".

Figure 5:
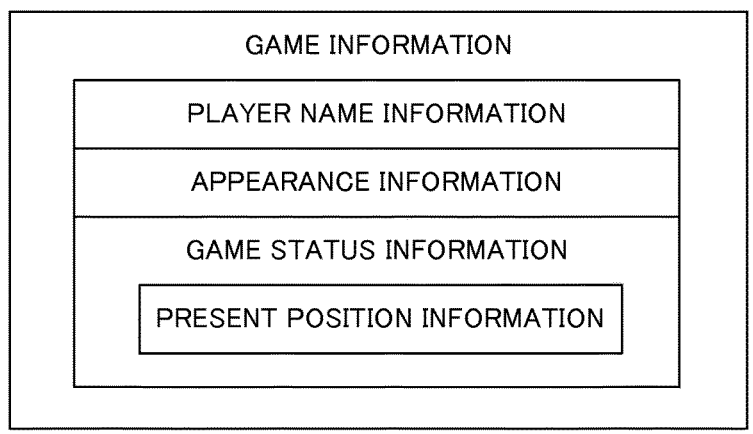
FIG. 5 is a diagram illustrating a non-limiting example of transmitted and received game information.

As shown in FIG. 5, the "game information" includes player name information, appearance information, and game status information. The player name information is information representing the name of a player (or a player character), for example, a player name (or a player character name) registered in the handheld game apparatus 10*b* by the player B. The appearance information is information representing the appearance of a passerby that appears in the shopping center in the game world, for example, information (an appearance identification code or the like) representing the appearance of a player character registered in the handheld game apparatus 10*b* by the player B. The game status information is information representing the game status, and includes present position information representing the present position in the game world of, for example, the player character in the game executed in the handheld game apparatus 10*b* (i.e., the player character of the player B).

As for the timing at which the handheld game apparatus 10*a* receives the "game information" from the handheld game apparatus 10*b*, various timings are considered. For example, the timing may be when communication is automatically performed between the handheld game apparatus 10*a* and the handheld game apparatus 10*b*, or when the handheld game apparatus 10*a* receives a beacon signal (including the "game information") that is periodically broadcast by the handheld game apparatus 10*b*.

Simultaneously with the reception of the "game information" from the handheld game apparatus 10*b*, the handheld game apparatus 10*a* may transmit similar information to the handheld game apparatus 10*b*.

Figure 6:
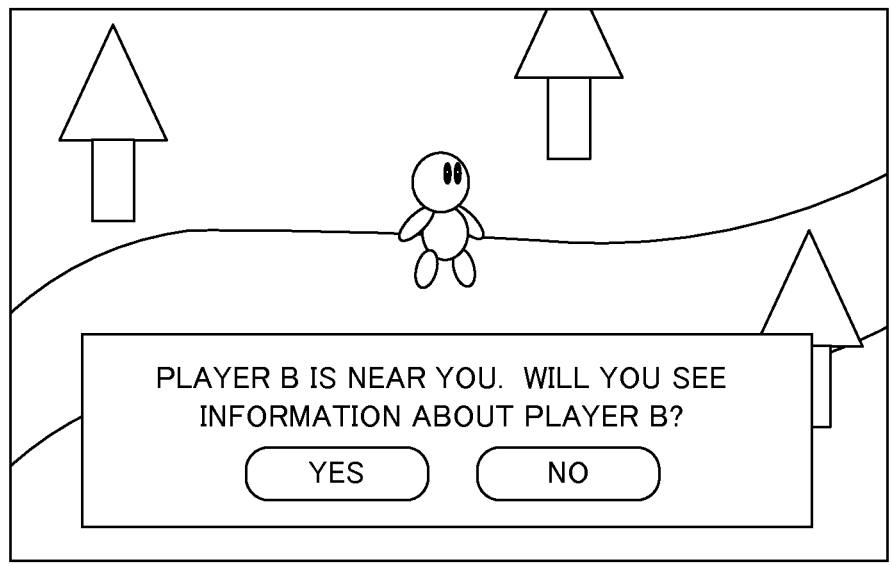
FIG. 6 is a diagram illustrating a non-limiting example of a game image.
Figure 7:
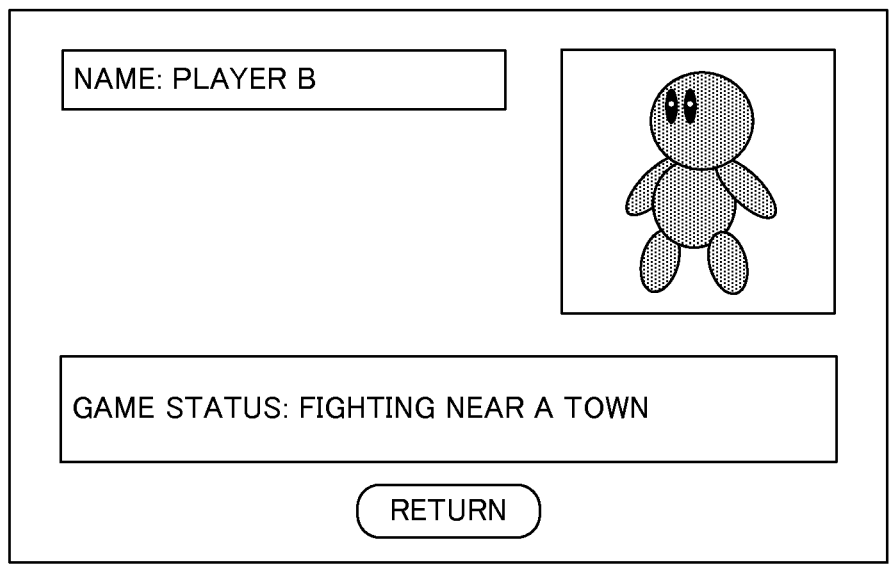
FIG. 7 is a diagram illustrating a non-limiting example of a game image.

When the handheld game apparatus 10*a* has received the "game information" from the handheld game apparatus 10*b*, a message as shown in FIG. 6 may be displayed in the handheld game apparatus 10*a*. Then, when the player A selects "YES", information relating to the player B (e.g., the name of the player B, the appearance of the player character of the player B, and the game status of the player B) may be displayed as shown in FIG. 7.

Figure 8:
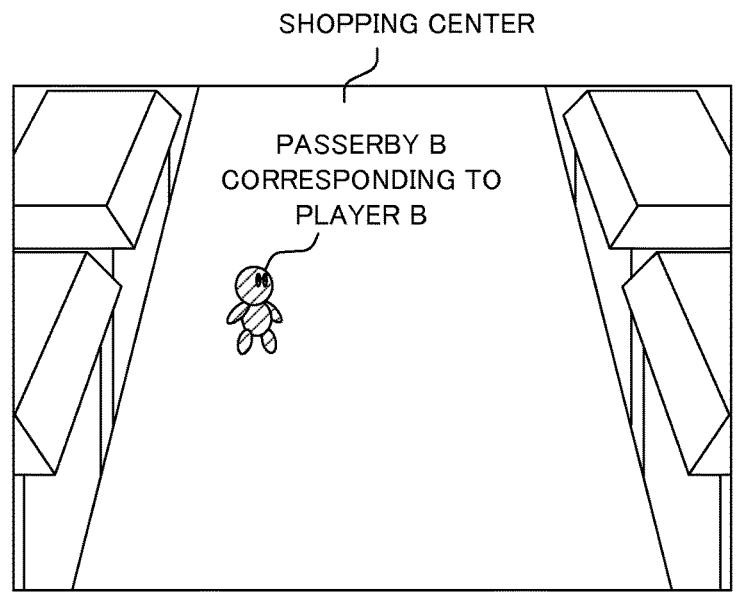
FIG. 8 is a diagram illustrating a non-limiting example of a state of a shopping center in the game world.

If a predetermined condition is satisfied after the handheld game apparatus 10*a* has received the "game information" from the handheld game apparatus 10*b*, the character corresponding to the player B appears as a passerby (passerby B) in the shopping center in the game world of the game of the handheld game apparatus 10*a*, as shown in FIG. 8. Specifically, the passerby B does not appear in the shopping center until a "predetermined time" elapses from when the handheld game apparatus 10*a* receives the "game information" from the handheld game apparatus 10*b*. When the "predetermined time" has elapsed after the handheld game apparatus 10*a* received the "game information" from the handheld game apparatus 10*b*, the passerby B appears in the shopping center. The appearance of the passerby is determined based on the appearance information included in the received "game information".

In the present embodiment, the "predetermined time" is determined based on the positional relationship between the shopping center and the present position of the player character of the player B in the game world (more exactly, the present position of the player character of the player B in the game world at a point in time when the handheld game apparatus 10*a* has received the "game information" from the handheld game apparatus 10*b*). For example, if the present position of the player character of the player B is near the shopping center, the passerby B appears in the shopping center in a relatively short time after the handheld game apparatus 10*a* has received the "game information" from the handheld game apparatus 10*b*. However, if the present position of the player character of the player B is far from the shopping center, the passerby B appears in the shopping center in a relatively long time after the handheld game apparatus 10*a* has received the "game information" from the handheld game apparatus 10*b*.

Figure 9:
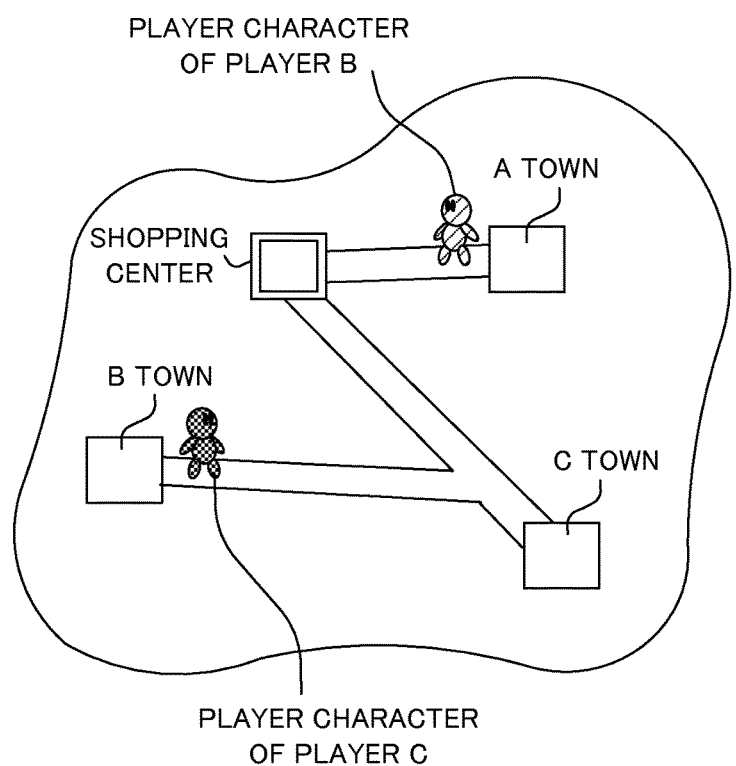
FIG. 9 is a diagram illustrating a non-limiting example of positions of player characters of players B and C, respectively, in the game world.
Figure 10:
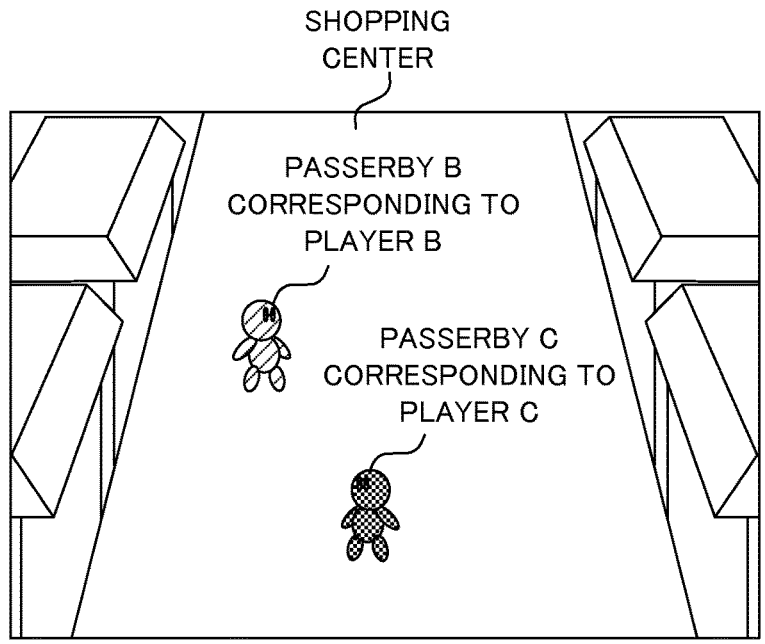
FIG. 10 is a diagram illustrating a non-limiting example of a state of the shopping center in the game world.

If the handheld game apparatus 10*a* receives a plurality of pieces of "game information" from a plurality of other handheld game apparatuses, respectively, a plurality of passersby corresponding to the other handheld game apparatuses appear in the shopping center. In this case, the appearance timings of the respective passersby are individually determined based on the present positions of the player characters of the players of the respective other handheld game apparatuses. For example, it is assumed that the handheld game apparatus 10*a* receives "game information" from the handheld game apparatus of the player B and "game information" from a handheld game apparatus of a player C almost simultaneously, and the present position of the player character of the player B and the present position of the player character of the player C are as shown in FIG. 9. In this case, after the predetermined time has elapsed, the passerby B corresponding to the player B, which is nearer to the shopping center than the passerby C corresponding to the player C (the distance is not a straight-line distance but a way to go), firstly appears in the shopping center. Thereafter, when a certain time has elapsed, the passerby C corresponding to the player C appears in the shopping center, as shown in FIG. 10. In the present embodiment, the distance between the shopping center and a player character of another player is determined by a way to go. In another embodiment, however, it may be determined by a straight-line distance.

Any event may be caused to occur when the player A controls the player character to talk to the passerby that appears in the shopping center.

Next, the operation of the handheld game apparatus 10 will be described in more detail with reference to FIGS. 11 to 13.

Figure 11:
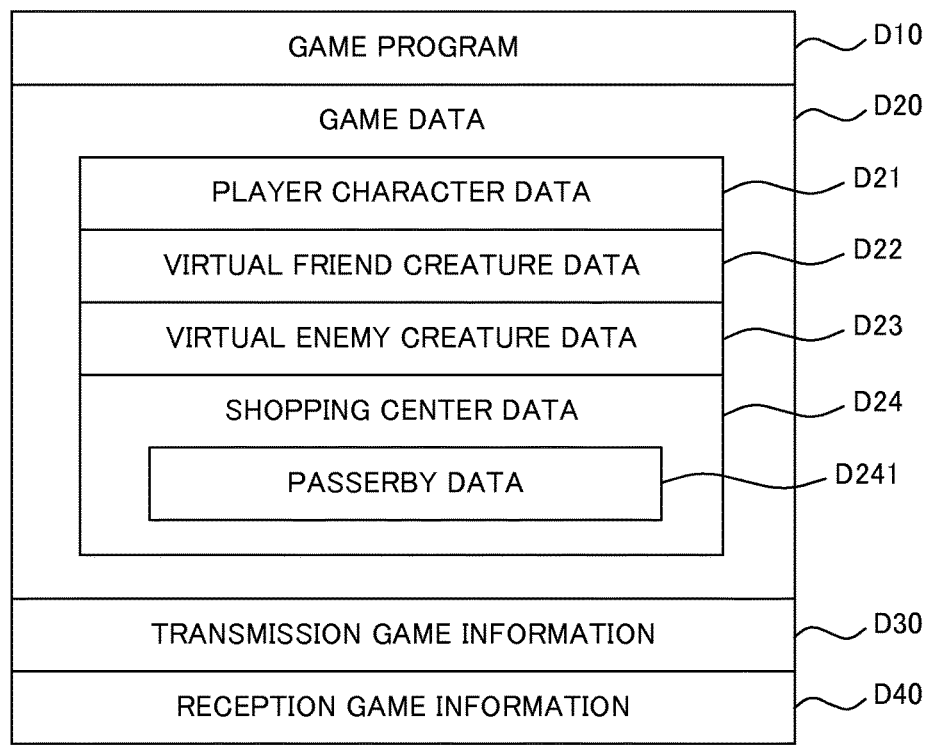
FIG. 11 is a diagram illustrating a non-limiting example of a computer program and data stored in a main memory.

FIG. 11 shows an example of a computer program and data stored in the main memory 15 of the handheld game apparatus 10.

A game program D10 is a computer program for causing the processor 13 to execute the above-described game. The game program D10 is read from the internal storage device 14 or an external storage device (e.g., a game cartridge) which is not shown, and is loaded into the main memory 15. The game program D10 may be received from another handheld game apparatus or a server device via the communication device 16, and loaded into the main memory 15.

Game data D20 is data utilized when executing the game program D10. The game data D20 includes player character data D21, virtual friend creature data D22, virtual enemy creature data D23, shopping center data D24, and the like.

The player character data D21 is data relating to a player character in the game world, and includes: data indicating the name of the player character; data indicating the position of the player character in the game world; data indicating the appearance of the player character; and the like.

The virtual friend creature data D22 is data relating to a virtual friend creature owned by the player character, and includes: data indicating the type of the virtual friend creature owned by the player character; parameters indicating various abilities of the virtual friend creature (e.g., level, physical strength, offensive power, defensive power, quickness, etc.); and the like.

The virtual enemy creature data D23 is data relating to a virtual enemy creature, and includes parameters indicating various abilities of the virtual enemy creature (e.g., level, physical strength, offensive power, defensive power, quickness, etc.), and the like.

The shopping center data D24 is data relating to the above-described shopping center, and includes passerby data D241 relating to passersby that appear (or will appear) in the shopping center, and the like. The passerby data D241 will be described later in detail.

The transmission game information D30 is game information to be transmitted to another handheld game apparatus. The reception game information D40 is game information received from another handheld game apparatus.

Figure 12:
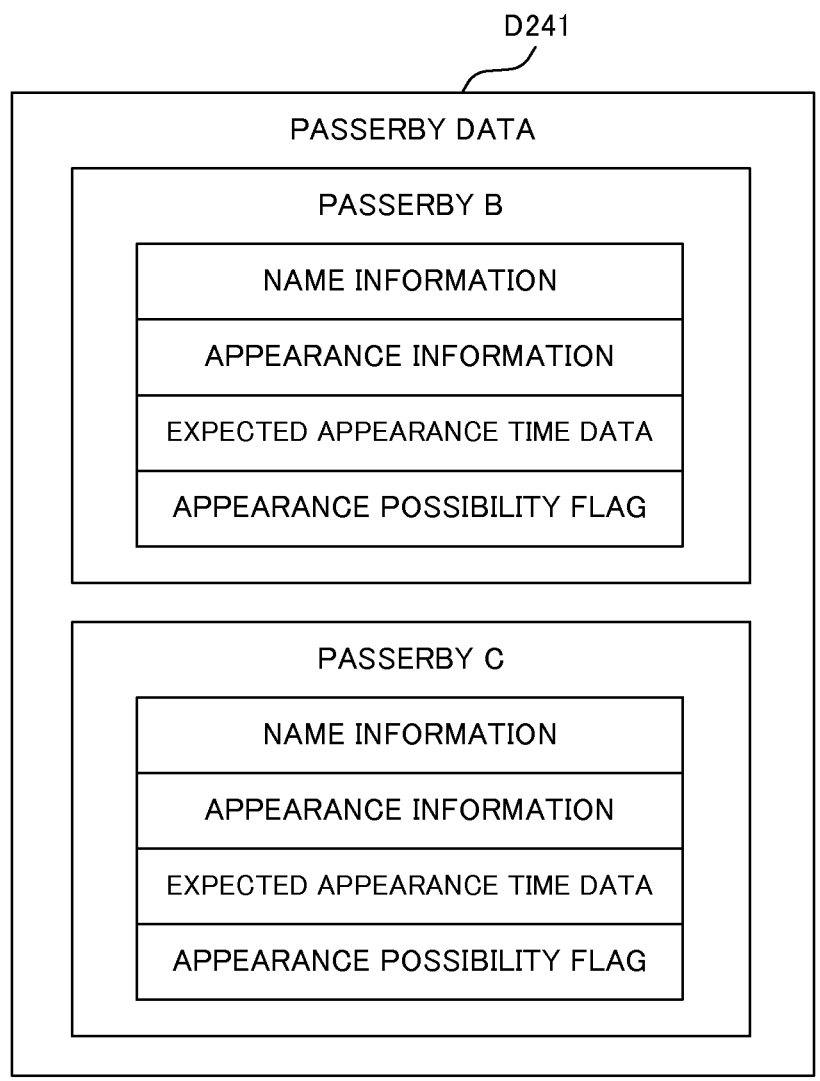
FIG. 12 is a diagram illustrating a non-limiting example of passerby data stored in a main memory.

As shown in FIG. 12, the passerby data D241 includes, for each passerby, name information, appearance information, expected appearance time data, an appearance possibility flag, and the like. The name information is information indicating the name of the passerby. The appearance information is information indicating the appearance of the passerby. The expected appearance time data is data indicating the time (in the real world) when the passerby will appear in the shopping center. The appearance possibility flag is a flag indicating whether the passerby can appear in the shopping center.

Figure 13:
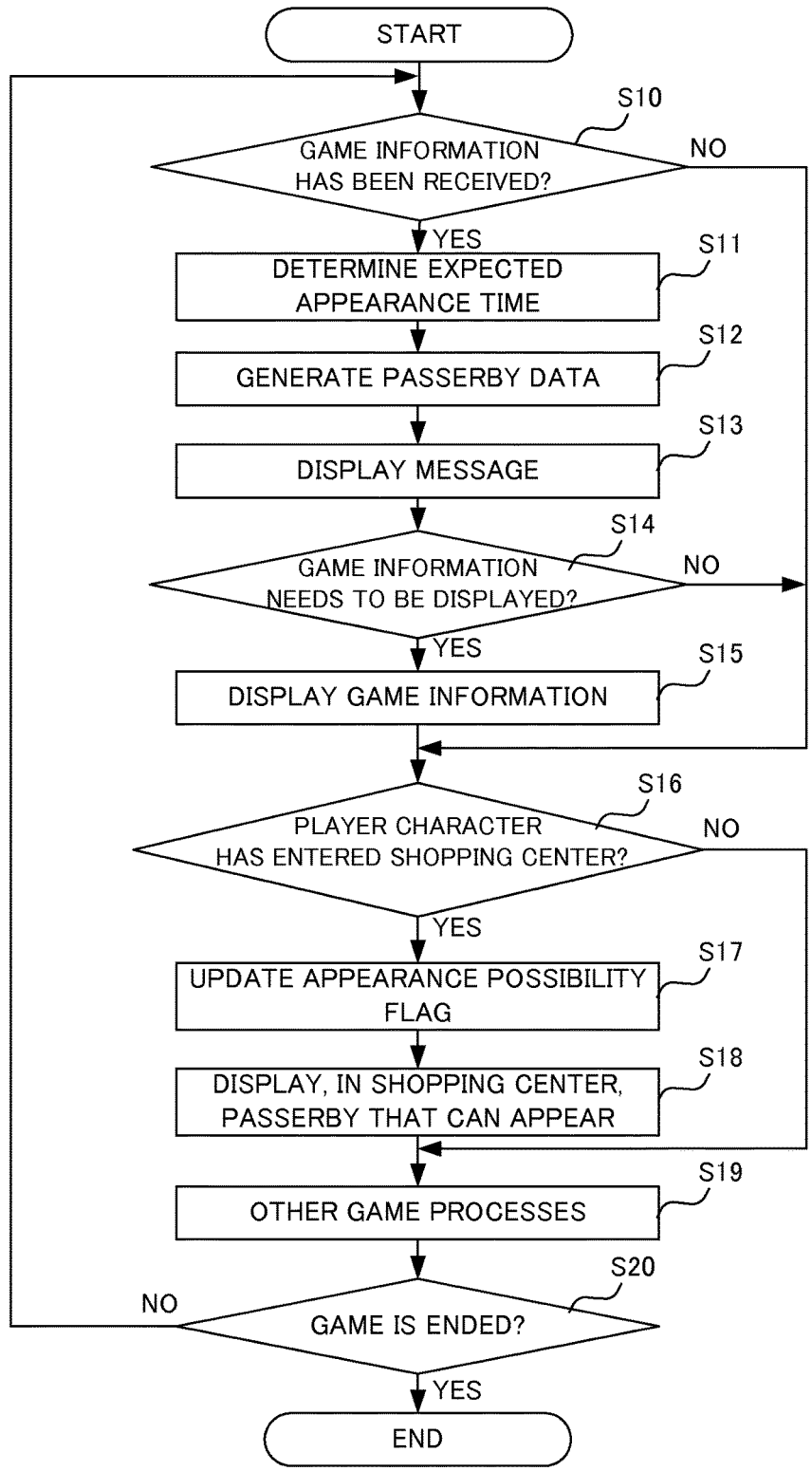
FIG. 13 is a flowchart illustrating a non-limiting example of a procedure of game processing executed by a processor.

The following will describe a procedure of game processing executed by the processor 13 of the handheld game apparatus 10 based on the game program D10, with reference to the flowchart of FIG. 13.

When execution of the game program D10 is started, firstly, in step S10, the processor 13 determines whether game information from another handheld game apparatus has been received via the wireless communication device 16. Upon determining that game information has been received, the processor 13 stores the received game information as reception game information D40 in the main memory 15, and the process goes to step S11, and otherwise, the process goes to step S16.

In step S11, the processor 13 determines, based on the reception game information D40, an expected appearance time of a passerby corresponding to the reception game information D40. Specifically, the processor 13 determines the expected appearance time, based on the "present position information" included in the reception game information D40, in accordance with the distance between the position of the shopping center in the game world and the position indicated by the "present position information".

In step S12, based on the reception game information D40 and the expected appearance time determined in step S11, the processor 13 adds data of the new passerby to the passerby data D241. The "name information" of the new passerby is set based on the "player name information" included in the reception game information D40, the "appearance information" of the new passerby is set based on the "appearance information" included in the reception game information D40, the "expected appearance time data" of the new passerby is set based on the expected appearance time determined in step S11, and the "appearance possibility flag" of the new passerby is set to an initial value (e.g., "0") indicating that the passerby cannot appear.

In step S13, the processor 13 displays a message as shown in FIG. 6.

In step S14, the processor 13 determines whether the received game information is to be displayed (i.e., whether the player has selected "YES" in FIG. 6). Upon determining that the received game information is to be displayed, the process goes to step S15, and otherwise, the process goes to step S16.

In step S15, the processor 13 displays an image as shown in FIG. 7 based on the reception game information D40.

In step S16, the processor 13 determines whether the player character has entered the shopping center. Upon determining that the player character has entered the shopping center, the process goes to step S17, and otherwise, the process goes to step S19.

In step S17, the processor 13 updates the "appearance possibility flag" of each passerby, which is included in the passerby data D241. Specifically, the processor 13 compares the present time obtained by the real-time clock 17 with the "expected appearance time data" of each passerby included in the passerby data D241, and updates the "appearance possibility flag" of the passerby whose expected appearance time has elapsed, from "0" to "1".

In step S18, the processor 13 displays a passerby that can appear in the shopping center. Specifically, a passerby whose "appearance possibility flag" is "1" in the passerby data D241 is displayed in the shopping center, based on the "appearance information" of the passerby.

In step S19, the processor 13 performs other game processes. Specifically, the processor 13 performs: a process of controlling the player character based on an input from the input device 11; a process of selecting a command based on an input from the input device 11; a process of causing the virtual friend creature and the virtual enemy creature to fight; a process of enhancing the ability of the virtual friend creature in accordance with the result of the fight with the virtual enemy creature; a process of generating a game image, based on the game data D20; and the like. These processes are general game processes, and therefore, are not described in detail here.

In step S20, the processor 13 determines whether the game is ended. Upon determining that the game is ended, the processor 13 ends the execution of the game program D10. Otherwise, the process returns to step S10, and the above-described series of process steps are repeated.

As described above, according to the present embodiment, in response to that "game information" from another handheld game apparatus has been received, a character corresponding to the another handheld game apparatus appears as a passerby in the shopping center. Therefore, the player is motivated to communicate with the another handheld game apparatus, thereby activating the communication between the handheld game apparatuses.

Further, according to the present embodiment, the timing of appearance of a passerby in the shopping center is not immediately after reception of "game information" from another handheld game apparatus, but after a predetermined time has elapsed. Therefore, the appearance of the passerby can surprise the player. Further, since indefiniteness of another handheld game apparatus is increased, the interest of the game can be enhanced.

Further, according to the present embodiment, the time from when "game information" from another handheld game apparatus is received to when a passerby appears in the shopping center is determined based on the distance between the position of the shopping center in the game world and the position of the player character of the player of the another handheld game apparatus. Accordingly, if the player character of the player of the another handheld game apparatus is distant from the shopping center (e.g., the player C in FIG. 9), the character corresponding to the player appears as a passerby in the shopping center after a long period of time has elapsed, and therefore, the passerby can be caused to appear in the shopping center at realistic and natural timing. For example, when the player confirms that the player B is fighting near the A town as shown in FIG. 7, if the character corresponding to the player B is displayed in the shopping center immediately after the confirmation, the player feels much discomfort. However, such a problem can be solved by the present embodiment.

The embodiment described above is merely one embodiment, and various modifications are considered.

For example, in the above-described embodiment, whether a passerby is to be caused to appear in the shopping center is determined by comparing the present time obtained from the real time clock 17 with the "expected appearance time data" of the passerby included in the passerby data D241. However, the present disclosure is not limited thereto. For example, a remaining time (e.g., number of frames) before appearance of the passerby in the shopping center may be counted down.

Further, in the above-described embodiment, a passerby is caused to appear in the shopping center, based on the elapsed time after reception of the "game information". However, the present disclosure is not limited thereto. A passerby may be caused to appear in the shopping center based on any other condition. For example, a passerby may be caused to appear in the shopping center at a specific time (e.g., midnight) in the real world. Alternatively, a passerby may be caused to appear in the shopping center when the number of steps of the player character from reception of the "game information" has exceeded a predetermined number.

In the above-described embodiment, handheld game apparatuses are used. However, the present disclosure is not limited thereto. Any information processing apparatuses, such as mobile phones, notebook personal computers, stationary game apparatuses, or desktop personal computers may be used.

While in the above-described embodiment a game program is executed, the present disclosure is not limited thereto, and any application program may be executed.

In the above-described embodiment, "game information" is received from another unspecified handheld game apparatus via a wireless communication function. However, the present disclosure is not limited thereto, and "game information" may be received by the Internet, a mobile phone network, or the like.

While in the above-described embodiment a character corresponding to another player is caused to appear as a passerby in the shopping center, the present disclosure is not limited thereto, and any object corresponding to another player may be caused to appear in any place in the virtual world.

For example, in the above embodiment, the plurality of processes shown in FIG. 13 are executed by one computer (processor 13). However, in another embodiment, these processes may be executed by a plurality of computers in a shared manner. In still another embodiment, a part or the entirety of these processes may be implemented by a dedicated circuit.

Further, in the above embodiment, the plurality of processes shown in FIG. 13 are executed on one information processing apparatus (handheld game apparatus 10). However, in another embodiment, these processes may be executed by a plurality of information processing apparatuses (e.g., the handheld game apparatus 10 and the server apparatus) in a shared manner.

What is claimed is:

1. A non-transitory computer-readable storage medium having stored therein information processing instructions executable by a digital processor of a first information processing apparatus having circuitry providing a communication function and an associated display device to perform operations comprising:

using the digital processor for creating a virtual world for displaying on the display device;

receiving object data from another unspecified information processing apparatus that is present within a predetermined distance range around the first information processing apparatus, via the circuitry providing a communication function;

using the digital processor for determining whether a predetermined object appearance condition is satisfied, wherein satisfaction of said object appearance condition is dependent at least in part upon an elapse of a predetermined period of time after reception of the object data from said another unspecified information processing apparatus has occurred;

causing a virtual object corresponding to the received object data to appear in the virtual world, in response to the object appearance condition being satisfied; and displaying an image of the virtual world on the display device.

2. The non-transitory computer-readable storage medium according to claim 1, wherein present position information is received from the another information processing apparatus together with the object data, the present position information representing the position of a player object in the virtual world, the player object being operated by a player of the another information processing apparatus, and wherein the information processing instructions cause the digital processor to set a duration for the predetermined time, based on the present position information received together with the object data.

3. The non-transitory computer-readable storage medium according to claim 2, wherein the object is caused to appear in a predetermined area in the virtual world, and the predetermined time is determined based on the positional relationship between the position indicated by the present position information received together with the object data, and the predetermined area.

4. The non-transitory computer-readable storage medium according to claim 3, wherein the longer the distance is between the position indicated by the present position information received together with the object data and the predetermined area, the longer a duration for the predetermined time is set.

5. The non-transitory computer-readable storage medium according to claim 1, wherein the object corresponding to the received object data is an object that is automatically controlled in the virtual world by the information processing apparatus.

6. The non-transitory computer-readable storage medium according to claim 1, wherein the object is caused to appear in a predetermined area in the virtual world, in response to the object appearance condition being satisfied, and even when the predetermined area is displayed on the display device, if the object appearance condition is not satisfied, the object is not displayed on the display device.

7. An information processing apparatus having at least one digital information processor capable of generating a virtual world for displaying on an associated display device and having circuitry providing a communication function for communicating with some other unspecified information processing apparatus, the information processing apparatus comprising:

circuitry for providing a communication function with another unspecified information processing apparatus including:
reception circuitry configured to receive object data from another unspecified information processing apparatus which is present within a predetermined distance range around the at least one digital information processing apparatus, and
a digital information processor configured to:
create a virtual world for displaying on the display device;
determine whether a predetermined object appearance condition is satisfied, wherein satisfying said object appearance condition is dependent at least in part upon an elapse of a predetermined period of time after reception of the object data from said another unspecified information processing apparatus has occurred;
cause a virtual object corresponding to the received object data to appear in the virtual world, in response to the object appearance condition being satisfied; and
display an image of the virtual world on the display device.

8. An information processing system including two or more information processing apparatuses each having at least one digital information processor capable of generating a virtual world for displaying on an associated display device and having circuitry providing a communication function for communicating with other information processing apparatus, each other information processing apparatus comprising:
reception circuitry configured to receive object data from another unspecified information processing apparatus which is present within a predetermined distance range around the at least one digital information processing apparatus;
a digital information processor configured to:
determine whether a predetermined object appearance condition is satisfied, wherein satisfying said object appearance condition is dependent at least in part upon an elapse of a predetermined period of time after reception of the object data from said another unspecified information processing apparatus has occurred;
create a virtual world for displaying on the display device and cause a virtual object corresponding to the received object data to appear in said virtual world, in response to the object appearance condition being satisfied; and
providing an image of the virtual world on the display device.

9. A method implemented by one or more digital information processing sections of an information processing apparatus having at least one digital information processing section capable of generating a virtual world for displaying on an associated display device and having circuitry providing a communication function for communicating with another information processing apparatus, the method comprising:
using one or more of the digital information processing sections for creating a virtual world for displaying on the display device;
receiving object data from another unspecified information processing apparatus which is present within a predetermined range around the at least one digital information processing apparatus;
using one or more of the digital information processing sections for providing a communication function by determining whether a predetermined object appearance condition is satisfied, wherein satisfying said object appearance condition is dependent at least in part upon an elapse of a predetermined period of time after reception of the object data from said another unspecified information processing apparatus has occurred;
using one or more of the digital information processing sections to create a virtual world for displaying on the display device and to cause an object corresponding to the received object data to appear in the virtual world, in response to the object appearance condition being satisfied; and
displaying an image of the virtual world on the associated display device.

* * * * *